United States Patent
El-Assir

(10) Patent No.: US 12,381,645 B2
(45) Date of Patent: Aug. 5, 2025

(54) SYSTEM AND METHOD FOR GENERATING A DIGITAL SIGNAL DESCRIPTION OF A COMPOSITE DIGITAL RADIO-FREQUENCY SIGNAL

(71) Applicant: Rohde & Schwarz GmbH & Co. KG, Munich (DE)

(72) Inventor: Rachid El-Assir, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 239 days.

(21) Appl. No.: 18/154,135

(22) Filed: Jan. 13, 2023

(65) Prior Publication Data

US 2024/0243827 A1    Jul. 18, 2024

(51) Int. Cl.
*H04B 17/391*    (2015.01)

(52) U.S. Cl.
CPC ..... *H04B 17/3912* (2015.01); *H04B 17/3913* (2015.01)

(58) Field of Classification Search
CPC .......... H04B 17/3912; H04B 17/3913
See application file for complete search history.

(56) References Cited

U.S. PATENT DOCUMENTS

| | | | |
|---|---|---|---|
| 4,168,502 A * | 9/1979 | Susie | G09B 9/54 342/172 |
| 11,303,348 B1 * | 4/2022 | Staple | G06N 3/045 |
| 11,716,641 B1 * | 8/2023 | Mayer | H04L 1/0006 370/252 |
| 2006/0046670 A1 * | 3/2006 | Colling | H04B 7/01 455/142 |
| 2010/0093300 A1 * | 4/2010 | Nuutinen | H04B 17/3912 455/296 |
| 2014/0091961 A1 * | 4/2014 | Foegelle | G01R 29/105 342/1 |

(Continued)

FOREIGN PATENT DOCUMENTS

| | | |
|---|---|---|
| DE | 102019215857 A1 | 10/2020 |
| EP | 4080238 A1 | 10/2022 |
| WO | 02/095426 A1 | 11/2002 |

OTHER PUBLICATIONS

Electronic Warfare Training Integrated Simulation System, Test, Validation & Training Solutions, ELT technology for innovation, https://www.elettronica.de/de/produkt/ew-tiss.

(Continued)

*Primary Examiner* — Wilson Lee
(74) *Attorney, Agent, or Firm* — Studebaker Brackett PLLC

(57) ABSTRACT

Disclosed is a system (1) for generating a digital signal description (3) of a composite digital radio-frequency, RF, signal (4) comprising component signals of mutually incompatible radio technologies. The system (1) comprises a simulation platform (11) and a digital interface (12). The simulation platform (11) comprises a simulator (111). The simulator (111) is configured to synthesize (21) the digital signal description (3) of the composite digital RF signal (4) in accordance with a user-defined simulation scenario. The digital interface (12) is configured to output (22) the digital signal description (3) of the composite digital RF signal (4).

13 Claims, 2 Drawing Sheets

(56) References Cited

U.S. PATENT DOCUMENTS

| | | | |
|---|---|---|---|
| 2015/0261895 A1* | 9/2015 | Schroeder | G06F 30/36 |
| | | | 703/2 |
| 2017/0054583 A1* | 2/2017 | Pratt | H04L 25/0204 |
| 2020/0136263 A1 | 4/2020 | Lee et al. | |
| 2020/0319325 A1 | 10/2020 | Kong | |
| 2021/0055382 A1 | 2/2021 | Kong | |
| 2021/0055383 A1 | 2/2021 | Lee | |
| 2021/0055384 A1 | 2/2021 | Lee | |
| 2021/0055411 A1 | 2/2021 | Lee et al. | |
| 2021/0175986 A1* | 6/2021 | He | H04B 17/364 |
| 2022/0066049 A1* | 3/2022 | Krefft | G01S 19/03 |
| 2022/0099824 A1* | 3/2022 | Beer | B60W 60/001 |
| 2022/0109515 A1* | 4/2022 | Chervyakov | H04B 17/21 |
| 2022/0342037 A1* | 10/2022 | Benneckenstein | G01S 7/4052 |
| 2023/0011979 A1* | 1/2023 | Judt | G05B 19/427 |
| 2024/0236887 A1* | 7/2024 | Liu | H04W 56/0015 |

OTHER PUBLICATIONS

Schnelleres Systemdesign Für Verifizierte Hardware, PathWave System Design (SystemVue), Keysight Technologies 2000-2021, https://www.keysight.com/de/de/products/software/pathwave-design-software/pathwavesystem-design-software.html.

* cited by examiner

SYSTEM AND METHOD FOR GENERATING A DIGITAL SIGNAL DESCRIPTION OF A COMPOSITE DIGITAL RADIO-FREQUENCY SIGNAL

TECHNICAL FIELD

The present disclosure relates to digital radio-frequency (RF) signal generation, and in particular to a system and a corresponding method for generating a digital signal description of a composite digital radio-frequency (RF) signal.

BACKGROUND ART

Many testing and measurement trends like massive multiple-input and multiple-output (MIMO), realistic simulation of complex radio environments including multiple RF emitters and RF receivers as well as multi-standard simulation are pushing solutions wherein many coherent RF signal generators are needed. This in turn requires adequate modelling of the radio environment and controlling of multiple RF signal generators simultaneously and seamlessly. Specialized solutions deal with RADAR-like signals only, whereas general purpose solutions are focused on the communication channel rather than on the radio environment and generally drive only a single RF signal generator.

SUMMARY

In view of the above-mentioned drawbacks and limitations, the present disclosure aims to improve a digital radio-frequency RF signal generation of the background art. These and other objectives are achieved by the embodiments as defined by the appended independent claims. Preferred embodiments are set forth in the dependent claims and in the following description and drawings.

A first aspect of the present disclosure relates to a system for generating a digital signal description of a composite digital RF signal comprising component signals of mutually incompatible radio technologies. The system comprises a simulation platform and a digital interface. The simulation platform comprises a simulator. The simulator is configured to synthesize the digital signal description of the composite digital RF signal in accordance with a user-defined simulation scenario. The digital interface is configured to output the digital signal description of the composite digital RF signal.

The digital signal description may comprise one or more of: an uncompressed I/Q waveform segment, and a compressed pulse descriptor word, PDW, pulse description.

The simulation platform may comprise one of: a personal computer, PC, and a server-based infrastructure.

The digital interface may comprise one or more of: a digital electrical interface, a digital optical interface, and a digital wireless interface.

The user-defined simulation scenario may comprise RF signal emitters, and one or more RF signal receivers.

The respective RF signal emitter and the respective RF signal receiver may be associated with an antenna pattern, a time-dependent spatial position, and a time-dependent spatial orientation.

The respective RF signal emitter may be associated with one of the mutually incompatible radio technologies, comprising: IEEE 802.11 Wireless Local Area Network, 3GPP 4G Radio Access Network, 3GPP 5G Radio Access Network, 3GPP 6G Radio Access Network, and digital radio detection and ranging, RADAR.

The user-defined simulation scenario may comprise a respective channel model between respective pairs of RF signal emitters and RF signal receivers.

The respective channel model may comprise additive white noise.

The respective channel model may comprise stochastic or geometric fading.

The user-defined simulation scenario may comprise a model of a near-field environment in accordance with one or more of: a terrain, a multi-path propagation, atmospheric effects, weather conditions, and a humidity.

The system may further comprise vector signal generators, respectively being connected to the simulation platform via the digital interface, and being configured to coherently generate the component signals of the composite digital RF signal in accordance with the digital signal description.

The system may further comprise a digital signal analyzer, being connected to the simulation platform via the digital interface, and being configured to analyze the digital signal description of the composite digital RF signal.

A second aspect of the present disclosure relates to a method for generating a digital signal description of a composite digital radio-frequency, RF, signal comprising component signals of mutually incompatible radio technologies. The method comprises: synthesizing the digital signal description of the composite digital RF signal in accordance with a user-defined simulation scenario; and outputting the digital signal description of the composite digital RF signal.

The method may further comprise: coherently generating the component signals of the composite digital RF signal in accordance with the digital signal description.

The method may further comprise analyzing the digital signal description of the composite digital RF signal.

BRIEF DESCRIPTION OF DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
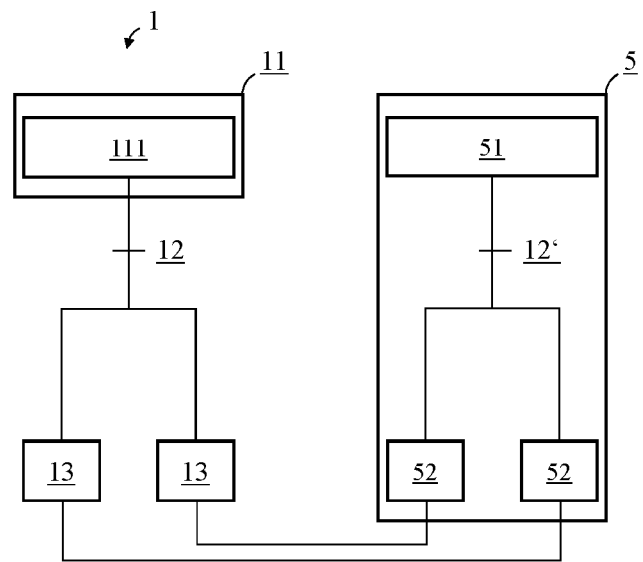

The drawings are to be regarded as being schematic representations, and elements illustrated in the drawings are not necessarily shown to scale. Rather, the various elements are represented such that their function and general purpose become apparent to those skilled in the art.

Figure 2:
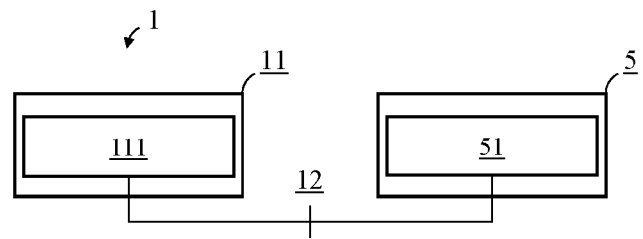
Figure 3:
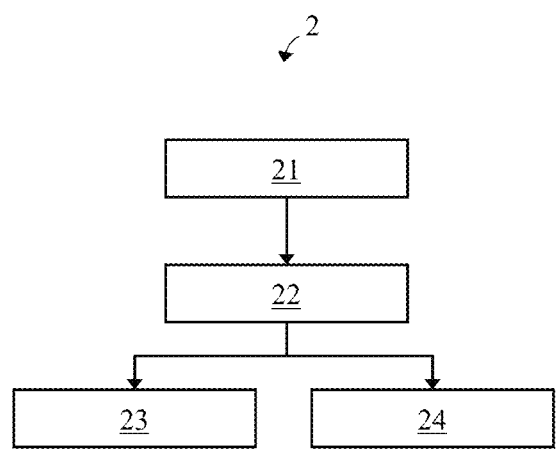

FIG. 1 illustrates an exemplary implementation of a system in accordance with the present disclosure;

FIG. 2 illustrates a further exemplary implementation of a system in accordance with the present disclosure; and FIG. 3 illustrates a method in accordance with the present disclosure.

DETAILED DESCRIPTIONS OF DRAWINGS

FIG. 1 illustrates an exemplary implementation of a system 1 in accordance with the present disclosure.

The system 1 is suitable for generating a digital signal description of a composite digital RF signal comprising component signals of mutually incompatible radio technologies.

A digital signal description as used herein may refer to a digital description of a generally analog signal, such as a time-varying electromagnetic wave, for example an RF signal. In other words, a digital signal description may refer to a discrete-time, discrete-value description or representation of the time-varying electromagnetic wave obtained by sampling and quantization. Such a digital signal representation may further undergo source coding for data compression. Generally, a digital signal description may include a number of RF signals of different RF emitters.

The digital signal description may comprise one or more of: an uncompressed in-phase/quadrature (I/Q) waveform segment, a compressed pulse descriptor word (PDW) pulse description, a neural network being configured to reproduce a radio channel, and any digital metadata being suitable for real-time reproduction by a signal generator.

An I/Q waveform segment as used herein may refer to a digital baseband signal description of an angle-modulated signal comprising two amplitude-modulated sinusoids that are offset in phase by one-quarter cycle (90 degrees or $\pi/2$ radians), called in-phase (I) and quadrature (Q) components. This representation preserves a phase information of the described angle-modulated signal.

A PDW pulse description as used herein may refer to a source-coded digital signal description. A PDW pulse description may represent a number of pulses. For each represented pulse, information such as time of arrival (ToA), frequency offset, amplitude offset, pulse duration and modulation parameters is provided. Custom edge shapes and/or repetitive pulse bursts may be represented as well. Based on this information, an I/Q waveform segment or an analog RF pulse may be generated for each represented pulse.

Composite as used herein may refer to including multiple components.

The mutually incompatible radio technologies may particularly comprise IEEE 802.11 Wireless Local Area Network (a.k.a. Wi-Fi), 3GPP 4G Radio Access Network (a.k.a. Long-Term Evolution/LTE), 3GPP 5G Radio Access Network (a.k.a. New Radio/NR), 3GPP 6G Radio Access Network, and/or digital radio detection and ranging (RADAR). Said radio technologies may further comprise terrestrial broadcasting technologies such as Digital Video Broadcasting (DVB-T) or Digital Audio Broadcasting (DAB), satellite communication technologies, such as DVB-S, OneWeb or the like, and/or satellite navigation technologies, such as Global Positioning System (GPS), Galileo, GLONASS, BeiDou, NavIC or the like. Said radio technologies may further comprise cellular communication technologies such as Verizon 5GTF, cellular Internet of Things (IoT), 3GPP WCDMA/HSPA+, GSM/EDGE, CDMA2000/1×EV-DO, TD-SCMA, or TETRA Rel. 2. Said radio technologies may further comprise wireless connectivity standards such as WiMAX, Bluetooth, RFID, NFC, LoRa, or UWB.

RADAR as used herein may refer to a concept or system for determining properties of generally moving objects, such as a range/distance, an angle, or a velocity, based on detection of radio waves. A RADAR system usually comprises an RF transmitter/emitter producing electromagnetic waves (i.e., a RADAR signal) in the radio or microwave frequency domain, a transmitting antenna, a receiving antenna (depending on the use case this may be the transmitting antenna), an RF receiver, and some sort of signal processing to determine the properties of the objects.

The system 1 comprises a simulation platform 11.

The simulation platform 11 may comprise one of: a personal computer, PC, and a server-based testing infrastructure, i.e., a testing software application being executed on a server which may be operated in a data center, for example.

The simulation platform 11 comprises a simulator 111, being configured to synthesize 21 the digital signal description of the composite digital RF signal in accordance with a user-defined simulation scenario.

The system 1 further comprises a digital interface 12.

The digital interface 12 may comprise one or more of: a digital electrical interface, a digital optical interface, and a digital wireless interface.

The digital interface 12 is configured to output 22 the digital signal description of the composite digital RF signal.

The user-defined simulation scenario may comprise RF signal emitters, and one or more RF signal receivers.

The respective RF signal emitter and the respective RF signal receiver of the user-defined simulation scenario may be associated with an antenna/radiation pattern, a time-dependent spatial position, and a time-dependent spatial orientation (i.e., antenna/radiation boresight).

An antenna/radiation boresight as used herein may refer to an axis/direction of maximum gain of a directional antenna or its antenna/radiation pattern.

The respective RF signal emitter may be associated with one of the mutually incompatible radio technologies mentioned previously. Thus, the user-defined simulation scenario yields a composite digital RF signal whose digital signal description comprises component signals of mutually incompatible radio technologies.

The user-defined simulation scenario may comprise a respective channel model between respective pairs of RF signal emitters and RF signal receivers.

A channel model as used herein may refer to a mathematical representation of the effects of a communication channel through which RF signals propagate. More generally, the channel model may refer to an impulse response of said channel in the time domain or its Fourier transform in a frequency domain.

The respective channel model may comprise additive white Gaussian noise (AWGN). This may particularly be used to model electronic noise in an RF front-end of a receiver, for example.

The respective channel model may comprise stochastic or geometric fading. This may particularly be used to model a variation of a signal attenuation in accordance with various variables, such as time, frequency, and relative spatial arrangement, for example.

The user-defined simulation scenario may comprise a model of a near-field environment in accordance with one or more of: a terrain, a multi-path propagation, atmospheric effects, weather conditions, and a humidity.

In accordance with FIG. 1, the system 1 may further comprise vector signal generators 13, respectively being connected to the simulation platform 11 via the digital interface 12, and being configured to coherently generate 23 the component signals of the composite digital RF signal in accordance with the digital signal description.

Coherent signal generation as used herein may refer to providing multiple signals with controlled (e.g., constant) phase relationships between them.

With continued reference to FIG. 1, the system 1 comprises a digital signal analyzer 5.

The digital signal analyzer 5 may comprise a digital signal processing (DSP) stage 51 and RF frontends 52 corresponding to the vector signal generators 13 in quantity and radio technology.

In the exemplary implementation of FIG. 1, the respective RF frontend 52 is connected to a respective vector signal generator 13 via an analog electrical RF interface, and to the DSP stage 51 via an internal interface 12' which may be analog or digital.

This may enable scenario-based dynamic simulation, including multiple RF signal emitter/receiver platforms with coherent motion, various antenna patterns, scans, terrain, power path loss, and the like, and simultaneous operation of multiple signal generators, wherein one software instance drives a coherent signal generation by the multiple signal generators.

FIG. 2 illustrates a further exemplary implementation of a system 1 in accordance with the present disclosure.

Contrary to the implementation of FIG. 1, the system 1 comprises a digital signal analyzer 5 whose DSP stage 51 is directly connected to the simulation platform 11 via the digital interface 12, and configured to analyze 24 the digital signal description of the composite digital RF signal without a detour to the analog domain. In other words, the digital signal analyzer 5 being compatible with the digital interface 12 may be tested without involving any vector signal generators 13 or RF frontends 52.

This may enable scenario-based dynamic simulation, including multiple RF signal emitter/receiver platforms with coherent motion, various antenna patterns, scans, terrain, power path loss, and the like, multi-standard wireless applications wherein users define their simulation scenario based on a scenario description to get a coherent channel simulation, 5G navigation, and complex scenarios requiring more computing capacity/power.

An emitter/receiver platform as used herein may particularly refer to cars, planes, satellites, persons, or masts, for example.

The direct testing capability may effectively decouple a development of the vector signal generators 13 and the RF frontends 52 from a development of the DSP stage 51.

FIG. 3 illustrates a method 2 in accordance with the present disclosure.

The method 2 is suitable for generating a digital signal description of a composite digital RF signal comprising component signals of mutually incompatible radio technologies.

The method 2 comprises a step of synthesizing 21 the digital signal description of the composite digital RF signal in accordance with a user-defined simulation scenario.

The method 2 further comprises a step of outputting 22 the digital signal description of the composite digital RF signal.

The method 2 may further comprise a step of coherently generating 23 the component signals of the composite digital RF signal in accordance with the digital signal description (as implemented in the system 1 of FIG. 1).

Alternatively, the method 2 may further comprise a step of analyzing 24 the digital signal description of the composite digital RF signal (as implemented in the system 1 of FIG. 2).

The present disclosure provides a scalable scenario-based RF signal generation, allowing a simulation of very complex radio environments using server-based testing (SBT) infrastructure and a simultaneous control of multiple RF signal generators.

The present disclosure is general-purpose in that various kinds of radio technologies such as Wi-Fi, LTE, 5G, and the like are supported. This also empowers new trends like 5G navigation.

The technical effects and advantages described above equally apply to the system according to the first aspect and to the method according to the second aspect having corresponding features.

The invention claimed is:

1. A system for generating a digital signal description of a composite digital radio-frequency, RF, signal, wherein the composite RF signal is represented as a set of component signals each associated with a respective mutually incompatible radio technology,
the system comprising
a simulation platform, comprising
a simulator,
being configured to synthesize the digital signal description of the composite digital RF signal in accordance with a user-defined simulation scenario, wherein the digital signal description comprising one or more of: an uncompressed I/Q waveform segment, and a compressed pulse descriptor word, PDW, pulse description, each corresponding to a component signal of one of the incompatible radio technologies;
a digital interface,
being configured to output the digital signal description of the composite digital RF signal; and
vector signal generators, respectively
being connected to the simulation platform via the digital interface; and being configured to coherently generate the component signals of the composite digital RE signal in accordance with the digital signal description.

2. The system of claim 1,
the simulation platform comprising one of:
a personal computer, PC, and
a server-based infrastructure.

3. The system of claim 1,
the digital interface comprising one or more of:
a digital electrical interface,
a digital optical interface, and
a digital wireless interface.

4. The system of claim 1,
the user-defined simulation scenario comprising
RF signal emitters, and
one or more RF signal receivers.

5. The system of claim 4,
the respective RF signal emitter and the respective RF signal receiver being associated with
an antenna pattern,
a time-dependent spatial position, and
a time-dependent spatial orientation.

6. The system of claim 4,
the respective RF signal emitter being associated with one of the mutually incompatible radio technologies, comprising:
IEEE 802.11 Wireless Local Area Network,
3GPP 4G Radio Access Network,
3GPP 5G Radio Access Network,
3GPP 6G Radio Access Network, and
digital radio detection and ranging, RADAR.

7. The system of claim 1,
the user-defined simulation scenario comprising a respective channel model between respective pairs of RF signal emitters and RF signal receivers.

8. The system of claim 7,
the respective channel model comprising
additive white noise.

9. The system of claim 7,
the respective channel model comprising
stochastic or geometric fading.

10. The system of claim 1,
the user-defined simulation scenario comprising
a model of a near-field environment in accordance with one or more of:
a terrain,
a multi-path propagation,
atmospheric effects,
weather conditions, and
a humidity.

11. The system of claim 1,
further comprising
a digital signal analyzer,
being connected to the simulation platform via the digital interface; and
being configured to analyze the digital signal description of the composite digital RF signal.

12. A method for generating a digital signal description of a composite digital radio-frequency, RF, signal, wherein the composite RF signal is represented as a set of component signals, each associated with a respective mutually incompatible radio technology, the method comprising
synthesizing the digital signal description of the composite digital RF signal in accordance with a user-defined simulation scenario, wherein the digital signal description comprising one or more of: an uncompressed I/Q waveform segment, and a compressed pulse descriptor word, PDW, pulse description, each corresponding to a component signal of one of the incompatible radio technologies;
outputting the digital signal description of the composite digital RF signal; and
coherently generating the component signals of the composite digital RF signal in accordance with the digital signal description.

13. The method of claim 12,
further comprising
analyzing the digital signal description of the composite digital RF signal.

* * * * *